(12) United States Patent
Kobtsev et al.

(10) Patent No.: US 8,995,478 B1
(45) Date of Patent: Mar. 31, 2015

(54) PASSIVELY MODE-LOCKED PULSED FIBER LASER

(71) Applicants: Sergey Mikhailovich Kobtsev, Novosibirsk (RU); Sergey Vladimirovich Kukarin, Novosibirsk (RU); Liudmila Pavlovna Simonova, Novosibirsk (RU)

(72) Inventors: Sergey Mikhailovich Kobtsev, Novosibirsk (RU); Sergey Vladimirovich Kukarin, Novosibirsk (RU); Liudmila Pavlovna Simonova, Novosibirsk (RU)

(73) Assignee: Tekhnoscan-Lab LLC, Novosibirsk (RU)

( * ) Notice: Subject to any disclaimer, the term of this patent is extended or adjusted under 35 U.S.C. 154(b) by 0 days.

(21) Appl. No.: 14/247,493

(22) Filed: Apr. 8, 2014

(51) Int. Cl.
*H01S 3/30* (2006.01)
*H01S 3/11* (2006.01)
*H01S 3/067* (2006.01)

(52) U.S. Cl.
CPC .............. *H01S 3/1112* (2013.01); *H01S 3/067* (2013.01)

USPC ........ 372/6; 372/18; 372/20; 372/21; 372/22; 372/29.014

(58) Field of Classification Search
USPC ............................................ 372/6, 18, 20–22
See application file for complete search history.

(56) References Cited

U.S. PATENT DOCUMENTS

| | | | | |
|---|---|---|---|---|
| 8,130,799 | B2 * | 3/2012 | Fermann et al. | 372/6 |
| 2006/0198399 | A1 * | 9/2006 | Jablonski et al. | 372/10 |
| 2014/0105233 | A1 * | 4/2014 | Yoon | 372/18 |

* cited by examiner

*Primary Examiner* — Dung Nguyen
(74) *Attorney, Agent, or Firm* — Nadya Reingand

(57) ABSTRACT

The device is proposed which provides mode-locked operation of a fiber laser. The principle of its operation is based on a focusing effect of Kerr lens. At high intensities of the light beam the Kerr element exhibits light focusing properties. The beam focused by the Kerr element enters a fiber core without losses thus providing an effective generation of mode-locked laser. In the preferred embodiment the Kerr element is positioned at one degree relative to a perpendicular to the beam direction.

19 Claims, 7 Drawing Sheets

PASSIVELY MODE-LOCKED PULSED FIBER LASER

REFERENCE TO RELATED APPLICATIONS

The present patent application claims priority to Russian application RU 20144100859 and RU 20144100855, both filed on Jan. 10, 2014.

FIELD OF INVENTION

The present invention is related to optical lasers in particular to fiber optical devices using laser radiation. The invention is applicable to various electro-optical laser systems.

BACKGROUND

A pulsed linear fiber laser with passive mode locking have been disclosed in the prior art (see, for example, WO 2004/059806), where the mode-locking function is performed by a saturable absorber made of carbon nano-tubes layered on a totally reflective mirror of the laser cavity. The primary drawback of such saturable absorbers, including those based on carbon nano-tubes, is their degradation under a high intensity of laser radiation which is required to saturate their absorption. Therefore, a lifetime of the saturable absorbers typically does not exceed the period of several hundred-several thousand hours. Moreover, the preparation of a uniform matrix of carbon nano-tubes and applying it to laser mirrors relies on a complex technological processes, which is not always possible even in the laboratory conditions.

A pulsed linear fiber laser with passive mode locking have been disclosed in the prior art (see, for example, US20090003391 where a low-repetition-rate ring-cavity passively mode-locked fiber laser) is disclosed. The mode-locking function is performed by a saturable absorber made of carbon nano-tubes or a semiconductor material.

The linear (non-circular) laser configuration employs reflectors that limit the laser radiation spectrum also limiting the shortest possible duration of output pulses. Moreover, the linear laser cavities also give rise to the effect of spatial hole burning within the gain medium, consequently leading to the presence of weakly competing components in the laser output spectrum. Interaction between these components generates au increased level of output intensity noise.

A linear fiber laser that is passively mode-locked by a semiconductor saturable absorber, such as one disclosed in U.S. Pat. No. 6,097,741, is the closest prior art to the present invention. The major drawback of this solution is degradation of semiconductor absorbers under a high incident intensity of laser radiation. Lifetime of semiconductor saturable absorbers cannot exceed several thousand hours. Moreover, the fabrication of a semiconductor saturable absorber and its integration into a mirror poses complex technological problems that demand expensive equipment and materials along with a high qualification of personnel.

A disc laser that can be mode-locked by a Kerr lens is also known in the prior art. The Kerr lens is an optical element which is placed at the waist of the intra-cavity laser beam (see, for example, WO2013050054). Unfortunately, this solution is only applicable to lasers with a disc-shaped active medium and cannot be used for fiber lasers' mode locking.

A pulsed ring fiber laser that is mode-locked due to the effect of non-linear polarisation evolution of radiation within a non-polarization-maintaining laser cavity fiber, such as disclosed in US 20100220751, is s the closest prior art to the present invention. However, such solution suffers from several disadvantages.

Firstly, the reported mode-locked operation is triggered, by an alignment of three phase plates (two quarter-wave and one half-wave plate), which poses algorithmic problems in their simultaneous adjustment. Usually one keeps adjusting them randomly until a mode locking spontaneously triggered combination is reached.

Secondly, such a passively mode-locked (due to the effect of non-linear polarization evolution) fiber laser can accommodate various types of mode-locked operation. In order to identify the triggered regime and determine the parameters of generated pulses, it is necessary to use a very specific measuring equipment every time after the phase plates are adjusted for mode locking triggering.

Third, such a passively mode-locked fiber lasers are relatively sensitive to the ambient temperature. A change as small as several degrees requires a new phase plate adjustment procedure to restart the mode locking.

There is a need for improved technique for mode-locked operation of fiber lasers.

SUMMARY OF THE INVENTION

The device is proposed which provides mode-locked operation of a fibre laser. The principle of its operation is based on a focusing effect of Kerr lens. At high intensities of the light beam the Kerr element exhibits light focusing properties. The beam focused by the Kerr element enters a fiber core without losses thus providing an effective generation of mode-locked laser. In the preferred embodiment The Kerr element is positioned at one degree relative to a perpendicular to the beam direction.

One embodiment describes a linear fiber mode-locked laser, while another embodiment discloses a ring laser operation.

In the preferred embodiment a Littrow prism is used as a reflector in the laser resonator.

BRIEF DESCRIPTION OF THE DRAWINGS

The following figures clarify the essence of the present invention.

DETAILED DESCRIPTION OF THE PREFERRED EMBODIMENTS

Figure 1:
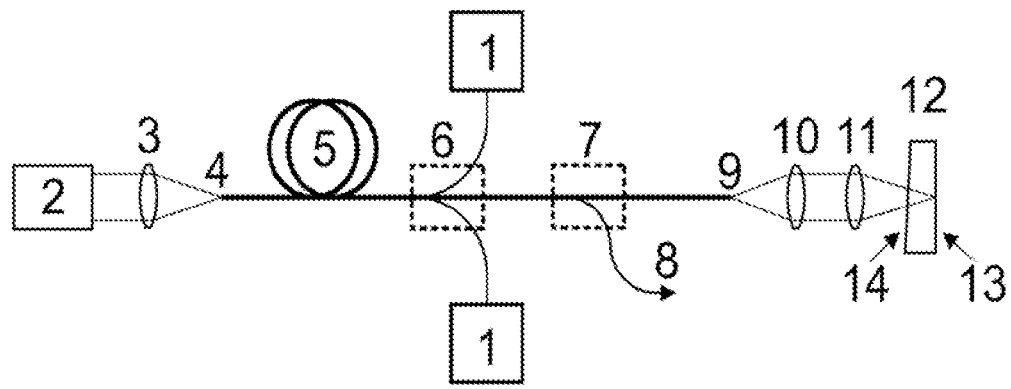
FIG. 1 shows a schematic diagram of a general embodiment of the proposed passively mode-locked pulsed linear fiber laser.

The present invention discloses a mode-locked pulsed linear and ring fiber laser configurations, whose fabrication does not require complicated and expensive technologies and materials. Moreover, the invention has virtually unlimited lifetime, also allowing tuning of the output wavelength within a broad spectral range.

The disclosed invention solves the problem of creation of a passively mode-locked pulsed linear fiber laser having: i) unlimited operation lifetime, ii) tunability within a broad spectral range) and iii) generation of the shortest possible pulses with not-limited intra-cavity radiation spectrum. All this achieved without investing into expensive materials and complicated fabrication technologies.

Mode-Locked Pulsed Linear Fiber Laser

The prior-art passively mode-locked pulsed linear fiber laser typically contains such elements as optically coupled pump radiation source, a polarization-maintaining linear fiber resonator, which, in turn, contains a consecutively-placed spectrally selective reflector, a first collimator, a first optical fiber's non-reflecting end (that does not reflect the laser radiation back into the fiber), a gain fiber, at least one wavelength-division fiber beam combiner (to guide the pumping radiation into the resonator), at least one polarization beam splitter (for coupling laser radiation out of the resonator), a second fiber's non-reflecting end (that does not reflect the laser radiation back into the fiber), a second collimator, an optical focusing element and a resonator mirror.

The proposed solution accordingly to the present invention includes placing, the resonator mirror at the first face of the optical element (which is transparent for laser radiation). The optical element has a Kerr non-linearity and thickness of more than 0.5 mm, while the other (second) face of the optical element is located between the mirror and the optical focusing element and also inclined with respect to the laser resonator axis by at least one degree.

In one embodiment invention, the second face of the optical element with Kerr non-linearity has an anti-reflective coatings. In particular, both faces of the optical element with Kerr non-linearity, through which passes the laser radiation have anti-reflection coatings.

Moreover, in yet another embodiment of the invention, the both faces of the optical element with Kerr non-linearity, through which the laser radiation passes, are positioned at the Brewster angle to the resonator axis.

In yet another embodiment of the invention, the spectrally selective reflector is a prism combined with a reflecting mirror or a Littrow prism with a reflective coating on the face receiving normally incident laser radiation refracted on entering through the input Brewster face of the prism. In particular, the distance between the resonator mirror and the closest to it face of the optical element with Kerr non-linearity does not exceed 1 mm.

In yet another embodiment of the invention, the spectrally selective reflector is a fiber Bragg grating or a free-space (volume) diffraction grating.

In yet another embodiment of the invention, the spectrally selective reflector may be a mirror with a certain specified spectral reflection band.

In yet another embodiment of the invention, the collimators and the optical focusing element have anti-reflective coatings.

In yet another embodiment of the invention, a polarizer with the faces through which laser radiation passes having an angle to the resonator axis of at least one degree is positioned between the optical focusing element and the closest to it collimator.

In yet another embodiment of the invention, the pump radiation source of the said fiber laser may be a Raman laser. The gain medium of such Raman laser may be a glass fiber which is doped with oxides of germanium, phosphorus, or a combination thereof, and the oxide matrix may include chemical compounds of the elements Si, N, Ga, Al, Fe, F, Ti, B, Sn, Ba, Ta, Zr, Bi. Moreover, the resonator of such Raman laser may be formed by two fiber Bragg gratings (with orthogonal to the beam or tilted lines) that reflect the radiation of the first Stokes component of the Raman laser.

In yet another embodiment of the invention, the resonator of the said Raman laser may be formed by four fiber Bragg gratings with orthogonal to the beam or tilted lines. Two such Bragg gratings are reflective to the radiation of the first Stokes component of the Raman laser, and the other two Bragg gratings are reflective to the radiation of the second Stokes component of the Raman laser.

As a result, the above-listed combination of features ensures the achievement of short duration of output pulses of a fiber laser with the possibility of detuning of the output radiation spectrum and stabilization of the achieved radiation parameters during an unlimited period of time.

A short pulse duration is achieved due to mode-locked operation with the use of Kerr effect (quadratic electro-optical effect), which provides a fast non-linear medium response with typical response time of $10^{14}$-$10^{15}$ seconds.

The Kerr effect leads to a change in the refractive index of an optical material that is proportional to the square of the applied electric field intensity. In case of an axially symmetric Gaussian radiation beam or a similar one where the transverse intensity has a profile decreasing towards the beam periphery, this effect induces in the optical medium as so-called "Kerr lens", a distribution of the refractive index value within the beam acting as a lens on the radiation passing through.

For the majority of optical materials that exhibit the Kerr non-linearity (e.g. quartz, multi-component glasses of the dense flint type, sapphire, calcite, and others), this lens is positive. Formation of a fast Kerr lens in the laser resonator makes it possible to create a resonator configuration, in which a high-intensity laser pulse has small optical losses, whereas longer pulses or continuous-wave radiation suffer greater optical losses.

Combined action of the Kerr lens in the optical element with Kerr non-linearity and spatial mode filtering the entrance to the optical fiber) for pulses of radiation with the highest peak power leads to generation of short radiation pulses with high peak power.

It is necessary to point out that no single device taken separately produces the effect resulting from the combination of all features making part of this invention.

FIG. 1 is a schematic diagram of a general example embodiment of a passively mode-locked pulsed linear fiber laser of the present invention. The linear fiber laser has a pump radiation source 1, spectrally selective reflector 2, first collimator 3, first end of the linear resonator fiber 4, polarization-maintaining gain fiber 5, fiber-based wavelength-division beam combiner for guiding the pump radiation into the resonator, polarization beam splitter 7 for coupling the laser radiation out of the resonator, output fiber 8, second end of the linear resonator fiber 9, second collimator 10, optical focusing element 11, optical element with Kerr non-linearity 12, resonator mirror 13, the opposite (second) face of the optical element with Kerr non-linearity 14.

Figure 2:
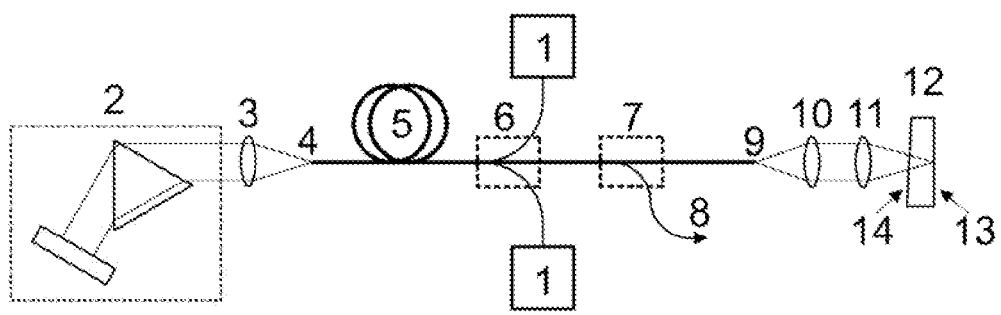
FIG. 2 shows a schematic diagram of a general embodiment of the invention, where the spectrally selective reflector is a prism combined with a reflecting mirror.

FIG. 2 is a schematic diagram of a general example embodiment of a passively mode-locked pulsed linear fiber laser of the present invention, in which spectrally selective reflector 2 is a prism combined with a reflecting mirror.

Figure 3:
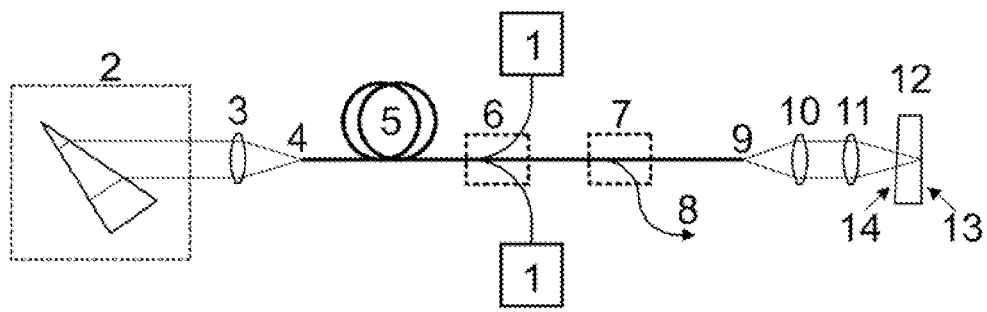
FIG. 3 shows a schematic diagram of a general embodiment of the invention, where the spectrally selective reflector is a Littrow prism.

FIG. 3 is a schematic diagram of a general example embodiment of a passively mode-locked pulsed linear fiber laser of the present invention, in which spectrally selective reflector 2 is a Littrow prism with a reflective coating on the face receiving normally incident laser radiation refracted on entering through the input Brewster face of the prism.

Figure 4:
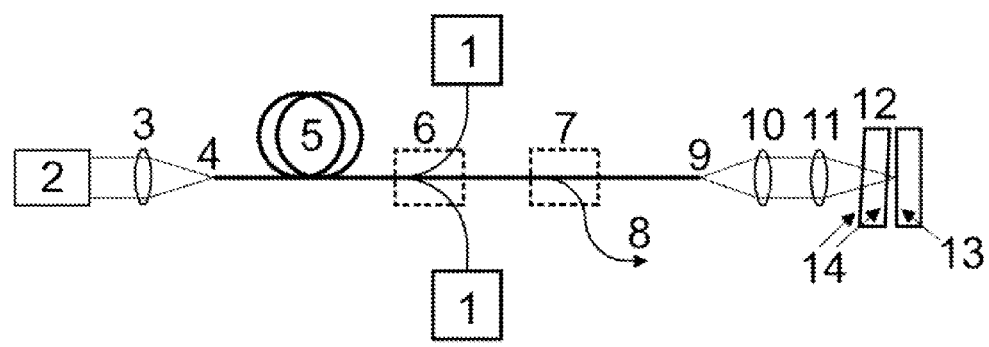
FIG. 4 shows a schematic diagram of a general embodiment of the invention, where the optical element with Kerr non-linearity is positioned between resonator mirror and optical focusing element.

FIG. 4 is a schematic diagram of a general example embodiment of a passively mode-locked pulsed linear fiber laser of the present invention, in which optical element with Kerr non-linearity 12, whose both faces through which laser radiation passes are inclined with respect to a perpendicular to the laser resonator axis by at least one degree, is positioned between resonator mirror 13 and optical focusing element 11.

Figure 5:
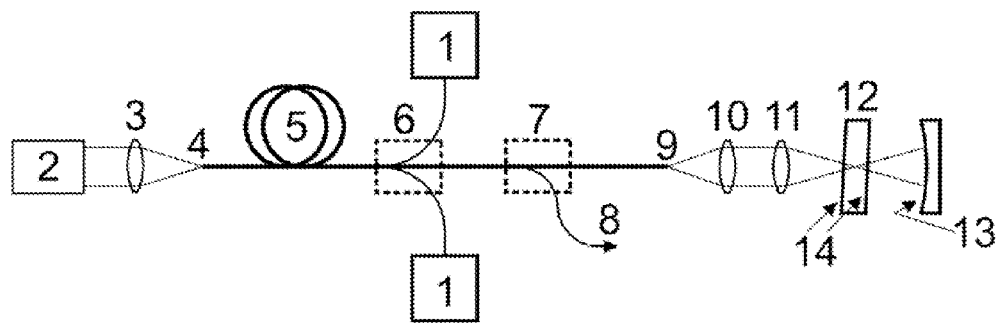
FIG. 5 shows a schematic diagram of a general embodiment of the invention, where the resonator mirror is spherical and optical element with Kerr non-linearity is positioned in the beam waist between spherical resonator mirror and focusing element.

FIG. 5 is a schematic diagram of a general example embodiment of a passively mode-locked pulsed linear fiber laser of the present invention, in which resonator mirror 13 is spherical and optical element with Kerr non-linearity 12, whose both faces 14 through which laser radiation passes are inclined with respect to the laser resonator axis by at least one degree, is positioned in the beam waist between spherical resonator mirror 13 and focusing element 11.

Figure 6:
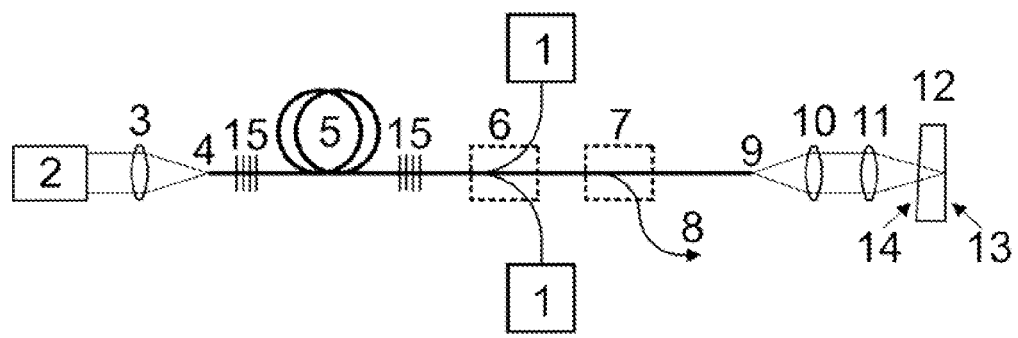
FIG. 6 shows a schematic diagram of a general embodiment of the invention, where the pump radiation source is a Raman laser and the resonator of the Raman laser is formed by two fiber Bragg gratings.

FIG. 6 is a schematic diagram of a general example embodiment of a passively mode-locked pulsed linear fiber laser of the present invention, in which the pump radiation source is a Raman laser and the resonator of the Raman laser is formed by two fiber Bragg gratings 15 having lines orthogonal or tilted with respect to the beam and reflecting, the radiation of the first Stokes component of the Raman laser.

Figure 7:
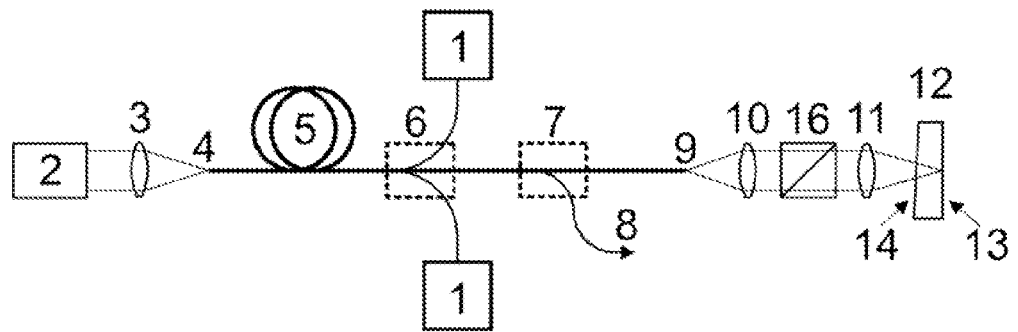
FIG. 7 shows a schematic diagram of a general embodiment of the invention, where the polariser is positioned between optical focusing element and the closest to it collimator.

FIG. 7 is a schematic diagram of a general example embodiment of a passively mode-locked pulsed linear fiber laser of the present invention, in which a polariser 16 with the faces through which laser radiation passes having an angle to the resonator axis of at least one degree is positioned between optical focusing element 11 and the closest to it collimator 10.

With the references to the FIG. 1-FIG. 7, the pump radiation generated by optical pump radiation source 1 is guided through wavelength-division fiber beam combiner 6 into gain fiber 5 and brings the laser's active medium into an active state. Laser generation takes place in a linear resonator where one of the mirrors is spectrally selective reflector 2 and the other mirror is reflective face 13, which face is flat when it belongs to optical element with Kerr non-linearity 12 or spherical when it belongs to a separate spherical mirror. Face or faces) 14 of the optical element with Kerr non-linearity has (or have) an anti-reflection coating. Fiber ends 4 and 9 are cleaved at an angle so that they do not reflect laser radiation back into the fiber. Collimators 3 and 10 collimate the radiation exiting from the fiber ends. Optical focusing element 11 focuses laser radiation onto element with Kerr non-linearity 12. Collimators and optical focusing elements can be both single lenses and multi-component objective lens assemblies. Laser output 8 is coupled out of the laser resonator through polarization beam splitter 7. Beam splitter 7 with polarization discrimination in combination with polarization-maintaining gain fiber ensures generation inside the laser resonator of linearly polarized radiation and eliminates the effect of non-linear polarization evolution, which could otherwise occur if laser generated un-polarized radiation. Polarization discrimination within the laser resonator may be strengthened by placing a polarizer 16 into the resonator (FIG. 7).

Elimination of the effect of non-linear polarization evolution (undesirable in this case) is necessary in order for mode locking to only be triggered by the Kerr effect changing the refractive index of optical materials proportionally to the square of the applied electric field intensity.

The Kerr effect features fast non-linear medium response with typical response time of $10^{14}$-$10^{15}$ s, which allows using it for generation of extremely short pulses, whose duration may cover only one period of electromagnetic field oscillation. Due to change in radiation focusing, the Kerr lens may improve or worsen the resonator alignment. For instance, if the radiation beam in FIG. 1 is focused behind face 13 (the distance between focusing element 11 and reflective surface 13 is less than the focal length of focusing element 11), a Kerr lens in optical element 12 will bring the beam focal point onto face 13.

In this case, optical losses in the resonator are greater without the Kerr lens, since the beam is focused behind reflective face 13 and not on it. Correspondingly, a short high-intensity laser pulse will have lower optical losses in such a "misaligned" optical system, compared to a longer pulse or to continuous-wave radiation. It is due to the laser resonator being initially somewhat misaligned (radiation is focused behind the reflective surface and not on it), that mode-locked operation due to the Kerr effect is favored since pulsed laser radiation in this regime has lower optical losses.

Such mode locking may be achieved when the optical element with Kerr non-linearity is located both close to the radiation focal point (FIG. 1) and immediately in the focal point (FIG. 5). In this case, the initially somewhat misaligned laser resonator (the radiation equiphase surface does not coincide with spherical reflective surface 13) becomes better aligned due to the Kerr effect in optical element 12, which brings the radiation equiphase surface to coincidence with spherical reflective surface 13.

The degree of radiation polarization within the laser resonator may be improved by placing a polarizer 16 with faces through which laser radiation passes positioned at an angle of at least one degree to the resonator axis into the resonator between collimator 10 and focusing element 11 (FIG. 7).

Any reflective faces of resonator optical elements located between laser resonator reflectors 2 and 13 should not reflect radiation back into the resonator, otherwise thus reflected radiation may cause parasitic generation not capable of solving the problem of the present invention. Fiber ends 4 and 9 do not reflect laser radiation back into the fiber either because they are cleaved at an angle of at least 8 degrees or because they are terminated with a coreless fiber. Reflective faces of polarizer 16 (FIG. 7) are tilted at an angle of at least one degree to the resonator axis and may have anti-reflection coatings. Collimators 3 and 10, optical focusing element 11, and one (FIGS. 1-3) or two (FIGS. 4, 5) faces of the optical element with Kerr non-linearity, may also have anti-reflection coatings.

The advantage of Kerr lens-based mode locking over that based on saturable absorbers is that Kerr lenses have unlimited, lifetime, operate in a broad spectral range, and the working radiation power density is only limited by the power density threshold of the Kerr lens material itself.

Mode-Locked Pulsed Ring Fiber Laser

In yet another embodiment of the invention, the spectrally selective fiber element may be a fiber-based birefringent spectral filter.

As a result, the above-listed combination of features ensures the achievement of short duration of output pulses of a fiber laser with the possibility of detuning of the output radiation spectrum, relatively low level of laser radiation intensity noise and high stability of the achieved radiation parameters during an unlimited period of time.

The shortest possible pulse duration can be achieved by: i) a "mirror-less" configuration of the laser resonator (ring geometry) that does not limit the laser radiation spectrum for generation of the shortest possible pulses, and ii) mode-locked operation with the use of Kerr effect (quadratic electro-optical effect), which provides a fast non-linear medium response with typical response time of $10^{14}$-$10^{15}$ seconds.

In yet another embodiment of the invention, the spectrally selective fiber element may be a fiber-based Fabry-Pérot interferometer or a fiber-based Mach-Zehnder interferometer.

Figure 8:
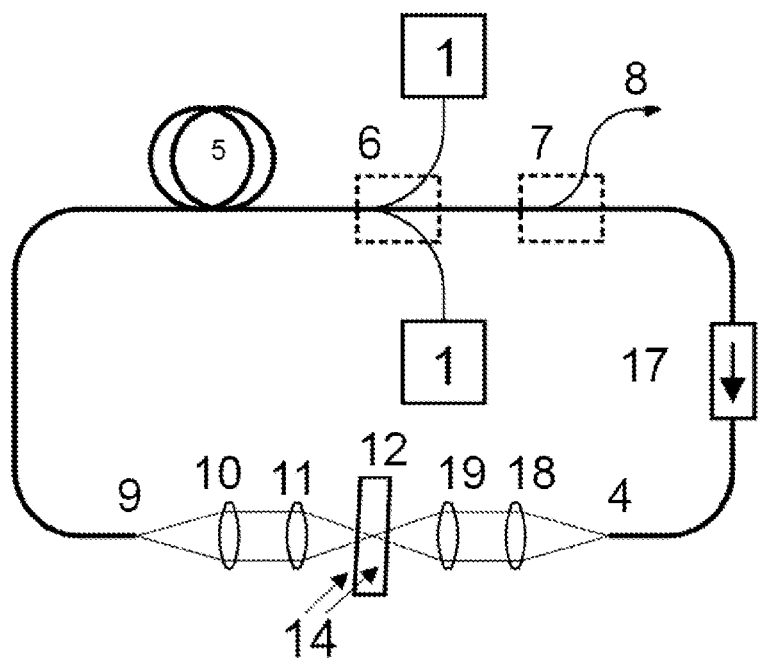
FIG. 8 shows a schematic diagram of a general embodiment of the proposed passively mode-locked pulsed ring fiber laser.

FIG. 8 is a schematic diagram of a general example embodiment of a passively mode-locked pulsed ring fiber laser of the present invention. The ring fiber laser has pump radiation source 1, gain fiber 5, fiber-based wavelength-division beam combiner 6 for guiding the pump radiation into the resonator, polarization beam splitter 7 for coupling the laser radiation out of the resonator, output fiber 8, optical polarization isolator 17 ensuring unidirectional veneration, first fiber end 4, first collimator 18, first optical focusing element 19, optical element with Kerr non-linearity 12, second optical focusing element 11, second collimator 10, second fiber end 9, and surfaces 14 of the optical element with Kerr non-linearity positioned at an angle to the resonator axis of at least one degree.

Figure 9:
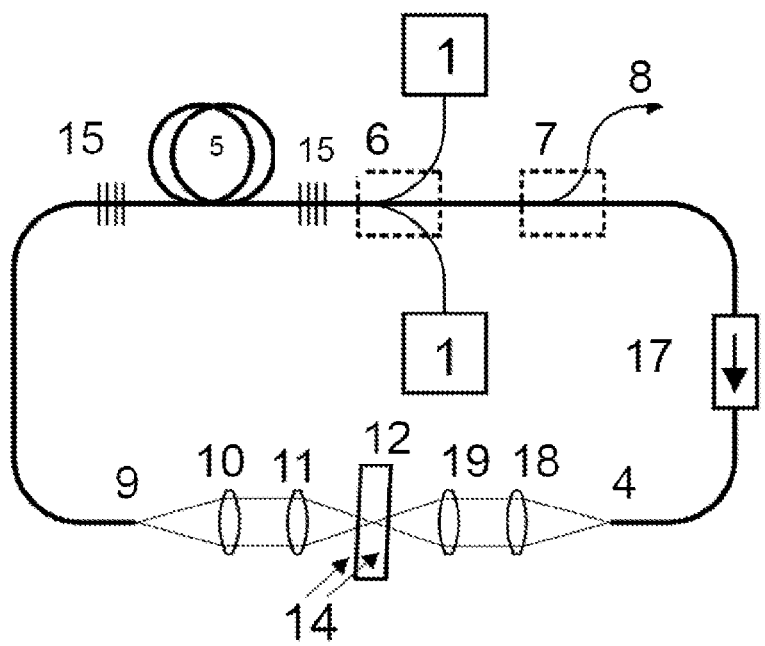
FIG. 9 shows a schematic diagram of the disclosed example embodiment of a passively mode-locked pulsed ring fiber laser, in which the pump radiation source is a Raman laser and the resonator of the Raman laser is formed by two fiber Bragg gratings.

FIG. 9 is a schematic diagram of a general example embodiment of a passively mode-locked pulsed ring fiber laser of the present invention, in which the pump radiation source is a Raman laser and the resonator of the Raman laser is formed by two fiber Bragg gratings 15 having lines orthogonal or tilted with respect to the beam and reflecting the radiation of the first Stokes component of the Raman laser.

Figure 10:
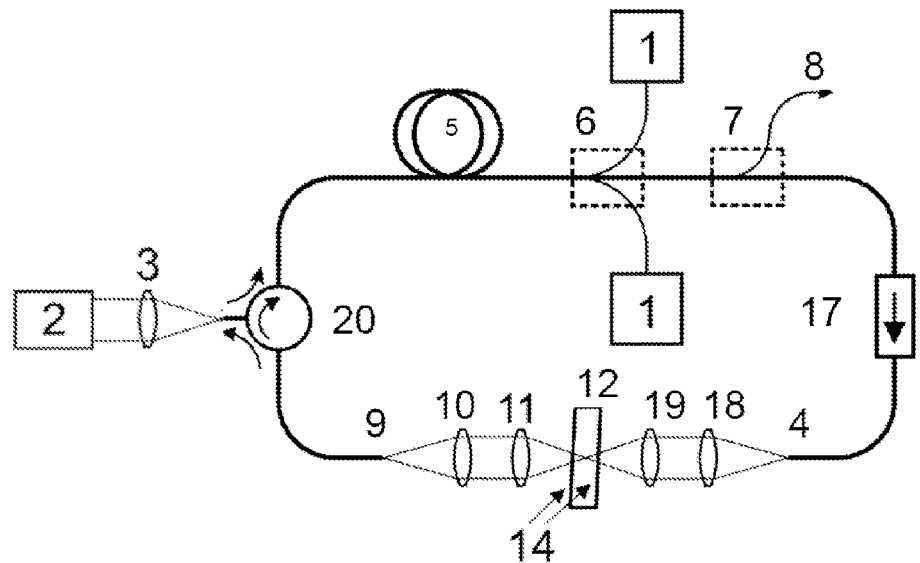
FIG. 10 shows a schematic diagram of the disclosed example embodiment of a passively mode-locked pulsed ring fiber laser, where a three-port circulator couples the laser resonator to spectrally selective reflector.

FIG. 10 is a schematic diagram of a general example embodiment of a passively mode-locked pulsed ring fiber laser of the present invention, in which a three-port circulator 20 coupling the laser resonator to spectrally selective reflector 2 is positioned between the second fiber end 9 and gain fiber 5.

Figure 11:
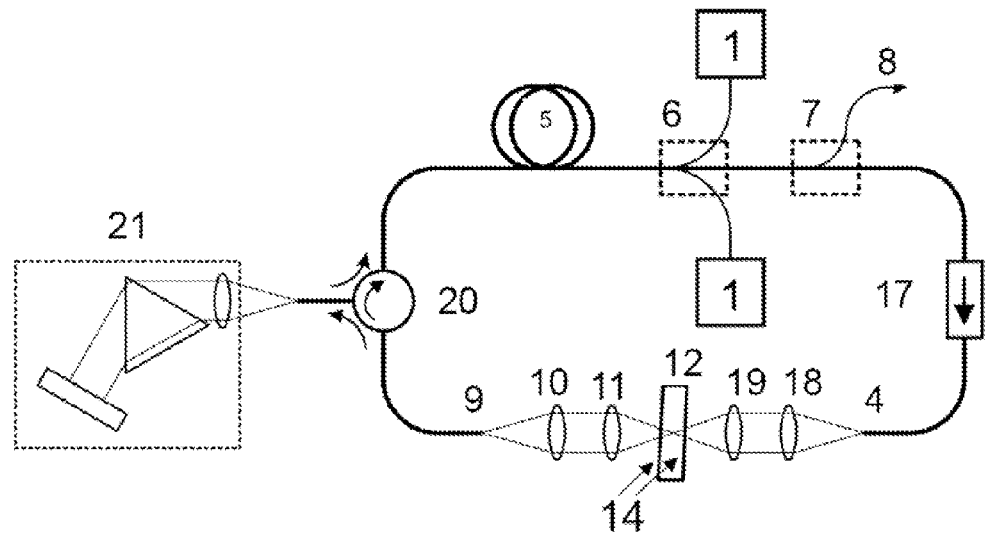
FIG. 11 shows a schematic diagram of the disclosed example embodiment of a passively mode-locked pulsed ring fibre laser, where spectrally selective reflector is a prism combined with a reflecting mirror.

FIG. 11 is a schematic diagram of as general example embodiment of a passively mode-locked pulsed ring fiber laser of the present invention, in which spectrally selective reflector 21 is a prism combined with a reflecting mirror.

Figure 12:
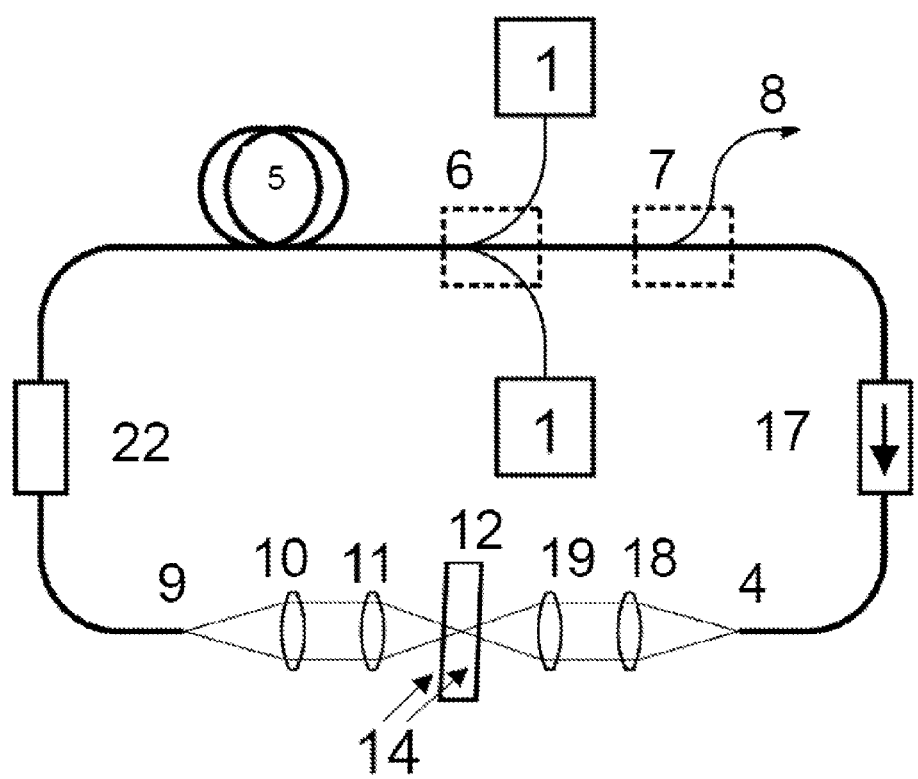
FIG. 12 shows a schematic diagram of a general example embodiment of a passively mode-locked pulsed ring fiber laser of the present invention, where a fiber-based spectrally selective optical element is positioned between the second fiber end and a gain fiber.

FIG. 12 is as schematic diagram of a general example embodiment of a passively mode-locked pulsed ring fiber laser of the present invention, in which a fiber-based spectrally selective optical element 22 is positioned between the second fiber end 9 and gain fiber 5.

With the references to the FIG. 8-FIG. 12, the pump radiation generated by optical pump radiation source 1 is guided through the wavelength-division fiber beam combiner 6 into the gain fiber 5 and brings the laser's active medium into an active state.

The laser generation takes place in a ring-shaped "mirror-less" resonator, where the unidirectional generation is ensured by an optical polarization isolator 17. Unidirectional generation allows a single-direction coupling of the laser radiation out of the resonator through the beam splitter 7.

Furthermore, the unidirectional "running-wave" operation prevents the effect of a spatial hole burning (that is inherent in linear lasers) from happening. The fiber ends 4 and 9 do not reflect the laser radiation back into the fiber because they are either cleaved at an angle of at least 8 degrees or terminated by a coreless fiber.

The radiation which exits from the fiber's ends is collimated by collimators 18 and 19. The laser radiation is focused on the optical element (with Kerr non-linearity) 12 by the optical focusing elements 19 and 11. Both collimators and focusing elements can be single lenses or multi-component lens assemblies (objectives). A beam-splitter 7 with polarization discrimination along with the resonator's polarization-maintaining fiber elements ensures the radiation generation inside the laser resonator. This radiation is linearly polarized that eliminates the effect of non-linear polarization evolution, which could otherwise (with un-polarized radiation) occur.

The polarization discrimination within the laser resonator can be strengthened by placing a polarizer into the collimated beam between a collimator and an optical focusing element. The laser radiation passes through the polarizer's faces that are positioned at an angle of a least one degree relatively the resonator axis in order to avoid possible spurious generation (which is caused by reflection of radiation off these faces).

Similarly to the linear fiber laser, in the ring fiber laser, the Kerr lens may improve or worsen the resonator alignment due to the change in radiation focusing. For example, the alteration of the distance between the optical focusing elements 19 and 11 leads to a misalignment of the optical system located between the fiber ends 4 and 9, also leading to higher optical radiation losses in the system. However, the effect of a Kerr lens inside the optical element 12 may restore the proper alignment of the optical system which is located between fiber's ends 4 and 9, reducing the optical losses accumulated through this system. Correspondingly, a short high-intensity laser pulse will have lower optical losses in such a "misaligned" optical system, compared to a longer pulse or continuous-wave radiation. Due to this particular fact, a laser with initially somewhat misaligned optical system (located between fiber ends 4 and 9), the mode-locked operation (due to the Kerr effect) is favorable since the pulsed laser radiation has lower optical losses.

Figure 13:
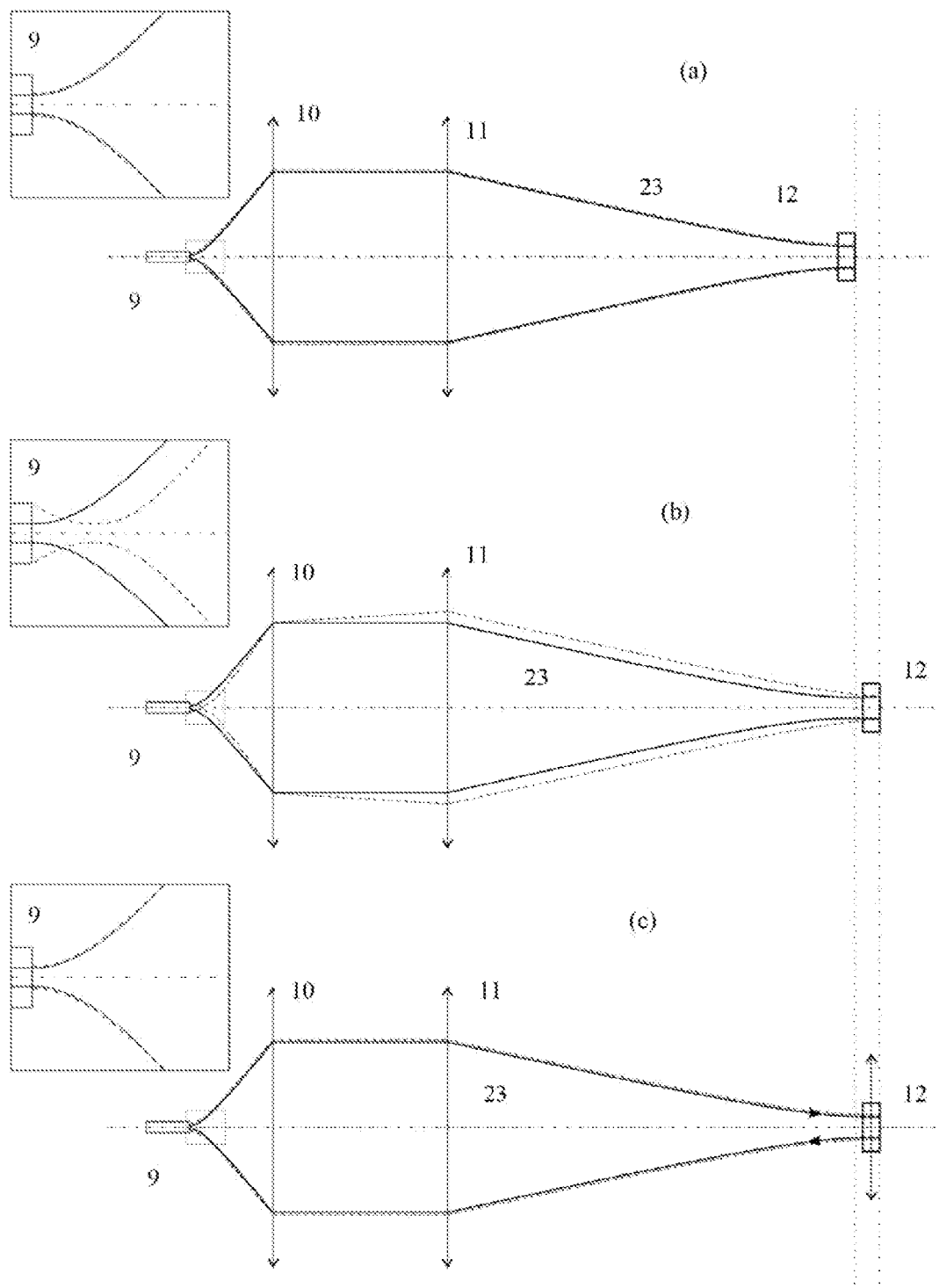
FIG. 13 shows a schematic diagram of the beam entering the waveguide, wherein (a) full adjustment, low power; (b) Kerr element is pushed back a little, there are losses of reflected radiation at the entrance of the fiber; (c) large capacity, the reflected light enters the fiber without loss.

FIG. 13 shows a focusing effect of the Kerr lens at high intensity of the input beam. At FIG. 13 (a) we demonstrate the beam focusing at low intensity level of the beam 23. The optical element 10 focuses the light beam 23 into the end of the fiber 9.

When the Kerr element 23 is displaced and has a position as shown in FIG. 13(b), the focus of the light beam 23 is displaced from the end 9, and the intensity of the beam at the end 9 is lower compared with FIG. 13 (a), it is below the threshold.

FIG. 13 (c) shows the device operation at the high intensity of the beam 23. In this case the Kerr lens 12 operates as a lens the focus point of the element 10 is shifted. Now it coincides with the end 9 of the fiber. This creates conditions for the mode-locked operation of the device.

Any reflective faces of the resonator's optical elements should not reflect radiation back into the resonator, otherwise it would cause a parasitic generation making the disclosed invention inefficient. Accordingly, the fiber ends 4 and 9 do not reflect the laser radiation back into the fiber either because they are cleaved at an angle of at least 8 degrees or because they are terminated by a coreless fiber. The laser radiation passes through the optical element (with Kerr non-linearity) which faces are positioned at an angle to the resonator axis of at least one degree. The faces of the optical focusing elements, optical element (with Kerr non-linearity), and polarizer, may have anti-reflection coatings to reduce the radiation optical losses through collimators.

Kerr lens-based mode-locking is preferable over the mode-locking based on saturable absorbers due to the Kerr-lenses have unlimited lifetime, wide spectral range operation. Moreover, for the Kerr lens-based mode-locking, the working radiation power density is only limited by the power density threshold of the Kerr lens material itself.

There are many optical materials exhibiting Kerr non-linearity and transparent over a broad spectral range, such as quartz, multi-component glasses of the dense flint type, sapphire, calcite, and others. Accordingly, a Kerr-lens may be formed by optical elements made of such materials within a wide spectral range. The optical elements can be implemented both in wavelength-tuneable lasers as well in lasers operating at different fixed wavelengths.

Since the non-linear optical Kerr effect changes the value of the refractive index proportionally to the second power of the intensity of the applied electric field, it is stronger at high radiation intensities. In the present invention, this is ensured by positioning the optical element with Kerr non-linearity in a radiation focal point. Tight focusing the laser radiation by a relatively short-focus element with a focal length of 30-50 mm allows formation of a substantial Kerr-lens in, optical elements with Kerr non-linearity and thickness of more than 0.5 mm.

The present invention may be realized with the use of many types of gain fiber, which is doped with rare-earth ions, such as erbium (Er3+), neodymium (Nd3+), ytterbium (Yb3+), thulium (Tm3+), holmium (Ho3+), bismuth (Bi3+), and others, as well as with the use of Raman fibers.

When a Raman laser is used as the fiber laser pump source, the gain band of the fiber laser corresponds either to i) the spectrum of a first Stokes component of the Raman laser (without any additional Bragg gratings), or ii) to the spectrum of the second Stokes component of the Raman laser (when two Bragg gratings are used that confine the radiation of the first Stokes component inside the Raman laser), or iii to the spectrum of the third Stokes component of the Raman laser (when four Bragg gratings are used, two of which confine the radiation of the first Stokes component inside the Raman laser, and the other two confine the radiation of the second Stokes component of the Raman laser inside its resonator).

These configurations correspond to a single-stage, two-stage, and three-stage Raman laser, respectively. Utilization of a Raman laser as the pump radiation source of the fiber laser allows generation of the disclosed laser in an ultra-broad spectral span, including ranges outside the gain profiles of rare-earth-doped fibers.

While there may be more than the three stages in a Raman laser used as the pump radiation source for the fiber laser, however, the conversion efficiency of Raman lasers decreases with the number of stages. Therefore, the wavelength of the Raman laser pump is usually selected as close as possible to the required generation range in order to minimize the number of stages in the Raman laser and to improve the overall laser system efficiency.

The possibility for the gain medium to utilize optical fibers doped with rare-earth ions, as well as Raman fibers, combined with the possibility of continuous detuning the spectrum of the output radiation and Kerr-based "all-wave" mode locking element, enables the laser disclosed in the present invention generating short pulses in an ultra-broad spectral range, corresponding to the intersection of transparency windows of the optical materials used in the laser.

In order to perform spectral detuning of the broad spectrum of the laser, spectrally selective reflective elements (FIG. 10 and FIG. 11) may be connected to the ring resonator of the laser through a three-port circulator 15. This circulator may be used to couple both fiber-based and volumetric spectrally selective reflectors, such as prisms, diffraction gratings, and others.

Alternatively, to perform spectral detuning of the broad spectrum of the laser, pass-through, spectrally selective, fiber elements may also be used (FIG. 12) based on Fabry-Pérot or Mach-Zehnder fiber interferometers or on fiber-based birefringent filters.

The possibility for the gain medium to use optical fibers doped with rare-earth ions, as well as Raman fibers, combined with the possibility of continuous detuning of the output radiation spectrum and Kerr-based "all-wave" mode locking element allows the laser of the present invention to generate short pulses in an ultra-broad spectral range corresponding to the intersection of transparency windows of the optical materials used in the laser.

The description of a preferred embodiment of the invention has been presented for purposes of illustration and description. It is not intended to be exhaustive or to limit the invention to the precise forms disclosed. Many modifications and variations will be apparent to practitioners skilled in this art. For example, this control method may be used for a body with a single extended antenna or with an optical transmitter with uncertainty in the heterodyne channel. It is intended that the scope of the invention be defined by the following claims and their equivalents.

What claimed is:

1. A passively mode-locked pulsed fiber laser, comprising:
   a fiber laser having a resonator and a gain fiber placed inside the resonator;
   an non-linear optical element with a Kerr non-linearity, the non-linear optical element placed inside the resonator;
   a light beam generated in the fiber passes the non-linear optical element;
   an element focuses light due to Kerr effect, and at high beam intensities above a threshold of a focus of the beam coincides with a fiber core at a first end of the fiber thus facilitating the beam entering the fiber and reducing optical losses;
   an optical core cross section performing a spatial filtering of the beam;
   further comprising a means to introduce a beam intensity fluctuation leading to modes synchronization and modelocking effect; the modelocking effect being achieved due to the reduction of optical losses at an entrance of the beam into the fiber core at the first end of the fiber when the intensity of the beam increases.

2. The device of claim 1 operating at low beam intensities without a laser beam generation.

3. The device of claim 1, wherein the non-linear optical element having a thickness of more than 0.5 mm.

4. The device of claim 1, further comprising a pump source, wherein the pump radiation source of the laser is a Raman laser, the Raman laser having a medium made of a glass doped with oxides of germanium, phosphorus or a combination thereof, the oxides include chemical compounds of the elements Si, N, Ga, Al, Fe, F, Ti, B, Sn, Ba, Ta, Zr and Bi.

5. The device of claim 1, wherein the fiber laser is a linear fiber laser.

6. The device of claim 1, wherein the fiber laser is a ring fiber laser.

7. The device of claim 1, further comprising
a pump radiation source being optically coupled to the fiber laser;
at least one wavelength-division fiber beam combiner, the beam combiner guiding the pumping radiation into the resonator.

8. The device of claim 1, further comprising:
at least one polarisation beam splitter to couple the laser radiation out of the resonator.

9. The device of claim 1, wherein a first resonator mirror is a spectrally selective reflector.

10. The device of claim 9, wherein the reflector is a prism combined with a Littrow prism,
the Littrow prism having a reflective coating,
the Littrow prism receiving a normally incident laser radiation,
the laser radiation being refracted on entering through the Brewster angle of the Littrow prism.

11. The device of claim 1, wherein the at least one face of the non-linear optical element, has an anti-reflection coating.

12. The device of claim 1, wherein both faces of the non-linear element through which laser radiation passes are inclined with respect to a perpendicular to a beam propagation direction by at least one degree.

13. The laser of claim 1, further comprising: a polarizer for the laser radiation discrimination, and the mode locking is only triggered by the Kerr effect changing a refractive index of the nonlinear element proportionally to a square of an applied electric field intensity.

14. The laser of claim 12, wherein the polarizer having an angle of at least one degree relatively to a resonator axis.

15. The laser of claim 1, the means is a focusing element for focusing the laser radiation the nonlinear element.

16. The device of claim 15, the optical focusing element and the non-linear optical element are both placed in a laser beam waist.

17. The device of claim 1, wherein a resonator mirror is located at a first face of the non-linear optical element.

18. The device of claim 1, wherein the resonator, the non-linear optical element, the gain fiber are polarisation-maintaining elements.

19. The device of claim 1, wherein the gain fiber is a glass optical fiber or a glass optical fiber doped with rare-earth elements, oxides of germanium, phosphorus, or a combination of thereof, the oxides may include chemical compounds of the elements Si, N, Ga, Al, Fe, F, Ti, B, Sn, Ba, Ta, Zr and Bi.

* * * * *